(12) United States Patent
Lee et al.

(10) Patent No.: US 9,541,804 B2
(45) Date of Patent: Jan. 10, 2017

(54) LIQUID CRYSTAL DISPLAY

(71) Applicant: Samsung Display Co., Ltd., Yongin, Gyeonggi-Do (KR)

(72) Inventors: Se Hyun Lee, Seoul (KR); Jang Wi Ryu, Seoul (KR); Ki Chul Shin, Seongnam-si (KR); Cheol Shin, Hwaseong-si (KR); Hak Sun Chang, Yongin-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/711,592

(22) Filed: May 13, 2015

(65) Prior Publication Data

US 2016/0097956 A1 Apr. 7, 2016

(30) Foreign Application Priority Data

Oct. 6, 2014 (KR) .................. 10-2014-0134506

(51) Int. Cl.
 *G02F 1/1343* (2006.01)
 *G02F 1/1337* (2006.01)

(52) U.S. Cl.
 CPC ... *G02F 1/134336* (2013.01); *G02F 1/133707* (2013.01); *G02F 2001/134318* (2013.01); *G02F 2001/134345* (2013.01)

(58) Field of Classification Search
 CPC G02F 1/1343; G02F 1/134309; G02F 1/1368; G02F 1/136286; G02F 1/133345; G02F 1/133707; G02F 1/13439; G02F 1/1337; G02F 1/133753; G02F 1/134336; G02F 1/133723; G02F 1/1333; G02F 2001/133742; G02F 2001/133757; G02F 2001/134372;G02F 2001/134318; G09G 2320/0252; G09G 3/3648; G09G 3/3225; G09G 2300/0447; G09G 2300/0426; G09G 2300/0439
 USPC .................. 349/139, 123, 138, 33, 130, 128, 129,349/141, 187, 43
 See application file for complete search history.

(56) References Cited

U.S. PATENT DOCUMENTS

2013/0242239 A1 9/2013 Chang et al.
2013/0242248 A1 9/2013 Chen et al.
2015/0355511 A1* 12/2015 Shin .................. G02F 1/134336
 349/144

(Continued)

FOREIGN PATENT DOCUMENTS

KR 1020110101894 A 9/2011

*Primary Examiner* — Thoi Duong
(74) *Attorney, Agent, or Firm* — Innovation Counsel LLP

(57) ABSTRACT

A liquid crystal display including: a lower electrode; an upper electrode facing the lower electrode; and a liquid crystal layer disposed between the lower electrode and the upper electrode and including a plurality of liquid crystal molecules aligned perpendicular to surfaces of the lower electrode and the upper electrode, wherein the lower electrode includes a center electrode disposed at the center thereof, a first cutout disposed at the center of the center electrode, and a plurality of minute branches disposed extending outwardly from a side edge of the center electrode, and the upper electrode includes a second cutout disposed between the minute branches and the first cutout, a third cutout connected to upper and lower vertices of the second cutout to form a boundary among a plurality of sub-regions together with the first cutout and a fourth cutout connected to left and right vertices of the second cutout.

14 Claims, 17 Drawing Sheets

(56) References Cited

U.S. PATENT DOCUMENTS

2016/0033828 A1\* 2/2016 Shin ................. G02F 1/134309
                                                                349/139
2016/0062189 A1\* 3/2016 Chang ............... G02F 1/134309
                                                                349/139

\* cited by examiner

Aligned

Misaligned by 8 μm

Aligned

Misaligned by 8 μm

FIG. 11

| | Aligned | Misaligned by 8 μm | Transmittance Deterioration | |
|---|---|---|---|---|
| Before | 0.220409 | 0.208361 | 94.50% | Increased by 0.92 % |
| After | 0.220623 | 0.210477 | 95.40% | |

LIQUID CRYSTAL DISPLAY

CROSS-REFERENCE TO RELATED APPLICATION

This application claims priority to and the benefit of Korean Patent Application No. 10-2014-0134506 filed in the Korean Intellectual Property Office on Oct. 6, 2014, the entire contents of which are incorporated herein by reference.

BACKGROUND (a) Related Field

The present system and method relate to a liquid crystal display, and more particularly, to a vertically aligned (VA) liquid crystal display with improved transmittance.

(b) Description of the Related Art

A liquid crystal display generally includes two display panels on which electric field generating electrodes such as a pixel electrode and a common electrode are formed, and a liquid crystal layer interposed between the two display panels. The liquid crystal display displays an image by applying a voltage to the field generating electrodes to generate an electric field in the liquid crystal layer. Particularly, by controlling the strength of electric field being generated, the liquid crystal display is able to manipulate the alignment of the liquid crystal molecules in the liquid crystal layer, and thereby control the polarization of incident light transmitted by the liquid crystal layer.

A vertically aligned liquid crystal display generally refers to one in which the liquid crystal molecules are aligned with their long axes perpendicular to the planar surfaces of the display panels in the absence of an electric field. A vertically aligned liquid crystal display generally has a higher contrast ratio is large and is easily configurable to achieve a wide viewing angle.

To implement a wide viewing angle in a vertically aligned liquid crystal display, each pixel of the liquid crystal display may be formed to include a plurality of domains in which the liquid crystal molecules in each domain have an alignment direction different from that of the liquid crystal molecules in the other domains. A means of forming the plurality of domains may include forming cutouts such as minute slits on the field generating electrode. Specifically, the plurality of domains are formed when the liquid crystal molecules are aligned by a fringe field formed between the edges of the cutouts and the field generating electrodes facing the edges of the cutouts.

A display area of a pixel may be sectored into a plurality of domains by domain-forming members. The liquid molecules in each domain are generally inclined in the same direction. The domain-forming members may be formed on a substrate of both display panels (e.g., an upper substrate and a lower substrate), or only on one substrate (e.g., the lower substrate).

Recently, a method has been developed to improve the response speed of the liquid crystal display while providing a wide viewing angle. The method pre-tilts the liquid crystal molecules so that the liquid crystal molecules are tilted even in the absence of an electric field. In one case, an alignment layer having various aligning directions may be used to pre-tilt liquid crystal molecules in the various directions. In another case, an alignment aid that can be hardened after applying an electric field may be added to the liquid crystal layer to pre-tilt the liquid crystal molecules of the liquid crystal layer in predetermined directions. The alignment aid may be hardened by heat or light such as ultraviolet rays. The electric field may be generated in the liquid crystal layer by applying a voltage to the electric field generating electrodes.

However, if an alignment aid for pre-tilting the liquid crystal molecules is used in the manufacture of the liquid crystal display, additional processes (e.g., hardening process for hardening the alignment aid) and costs may be required, and the manufacturing process may become complicated.

SUMMARY

The present disclosure provides a liquid crystal display capable of being manufactured at a low cost and capable of ameliorating transmittance deterioration even when a lower electrode and an upper electrode are misaligned with each other, and a manufacturing process thereof.

An exemplary embodiment of the present system and system provides a liquid crystal display including: a lower electrode; an upper electrode facing the lower electrode; and a liquid crystal layer disposed between the lower electrode and the upper electrode and including a plurality of liquid crystal molecules aligned perpendicular to surfaces of the lower electrode and the upper electrode, wherein the lower electrode includes a center electrode disposed at the center thereof, a first cutout disposed at the center of the center electrode, and a plurality of minute branches extending outwardly from a side edge of the center electrode, and the upper electrode includes a second cutout disposed between the minute branches and the first cutout, a third cutout connected to upper and lower vertices of the second cutout to form a boundary among a plurality of sub-regions together with the first cutout and a fourth cutout connected to left and right vertices of the second cutout.

The fourth cutout may include: a first branch cutout that is perpendicular to an adjacent data line and connected to the left and right vertices of the second cutout; and a second branch cutout that is separated from left and right ends of the upper electrode at a distance and connected to the left and right vertices of the second cutout and a vertex of the first branch cutout.

The second branch cutout may be separated from the left and right ends of the upper electrode by 8 μm or more.

The first cutout may include a cross-shaped cutout, a central cutout disposed at the center of the cross-shaped cutout, and a central minute cutout that extends from the cross-shaped cutout and the central cutout.

The cross-shaped cutout may include a horizontal cutout and a vertical cutout that cross each other at the center of the center electrode.

The second branch cutout may include a gap that is disconnectedly formed in a direction in which the horizontal cutout extends.

A width of the gap may be equal to or smaller than 4.5 μm.

The horizontal cutout may extend towards but end before reaching the gap P.

The horizontal cutout may extend through the gap.

The central cutout may be formed to have a polygonal shape including linear sides that are respectively disposed in sub-regions and a vertex connected to the cross-shaped cutout.

The central minute cutout may be disposed to extend in different directions in different sub-regions.

The second cutout may be formed to have a polygonal shape including linear cutouts that are respectively disposed in the sub-regions and a vertex connected to the third cutout.

The second cutout may be disposed to surround the first cutout.

The minute branches disposed in different sub-regions may extend in different directions.

Other technical objects desired to be achieved in the present system and method are not limited to the aforementioned objects, and other technical objects not described above will be apparent to those skilled in the art from the present disclosure.

According to exemplary embodiments of the present system and method, it is possible to manufacture a liquid crystal display having a low cost.

Further, it is possible to ameliorate transmittance deterioration even when the lower electrode and the upper electrode are misaligned from each other.

BRIEF DESCRIPTION OF THE DRAWINGS

FIG. 11 is a table illustrating how transmittance deterioration of a liquid crystal display according to an exemplary embodiment of the present system and method is ameliorated;

DETAILED DESCRIPTION OF THE EMBODIMENTS

Figure 1:
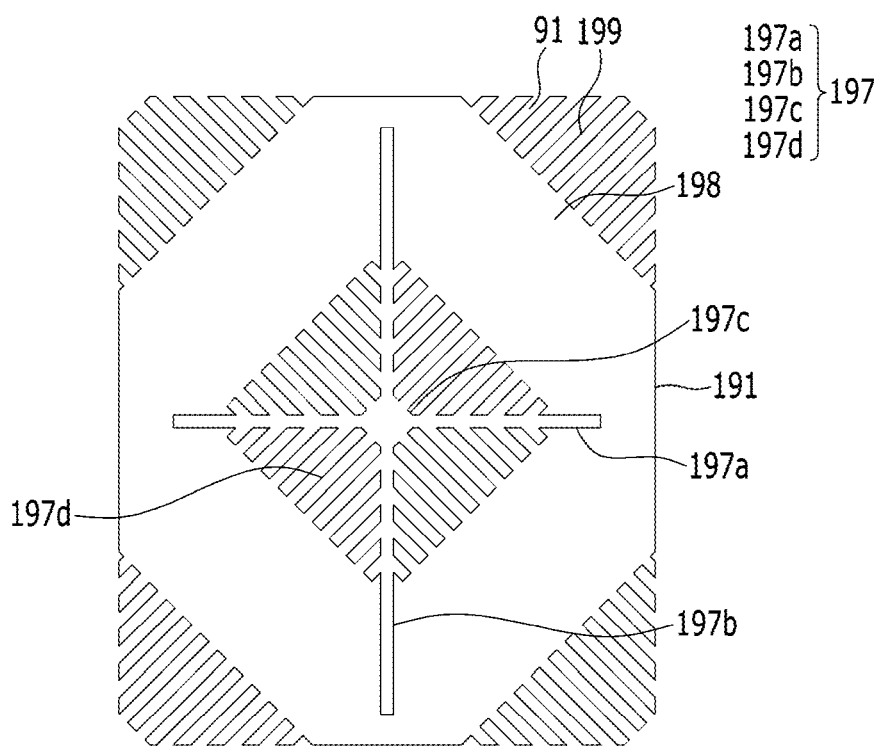
FIG. 1 is a top plan view of a lower electrode of a liquid crystal display according to an exemplary embodiment of the present system and method.

The present system and method are described hereinafter with reference to the accompanying drawings in which exemplary embodiments of the system and method are shown. Those of ordinary skill in the art would understand that the described embodiments may be modified in various different ways without departing from the spirit or scope of the present system and method.

In the drawings, the thickness of layers, films, panels, regions, etc., are exaggerated for clarity. Like reference numerals designate like elements throughout the specification. When an element such as a layer, film, region, or substrate is referred to as being "on" another element, it may be directly on the other element or intervening elements may also be present. In contrast, when an element is referred to as being "directly on" another element, there are no intervening elements present.

Figure 2:
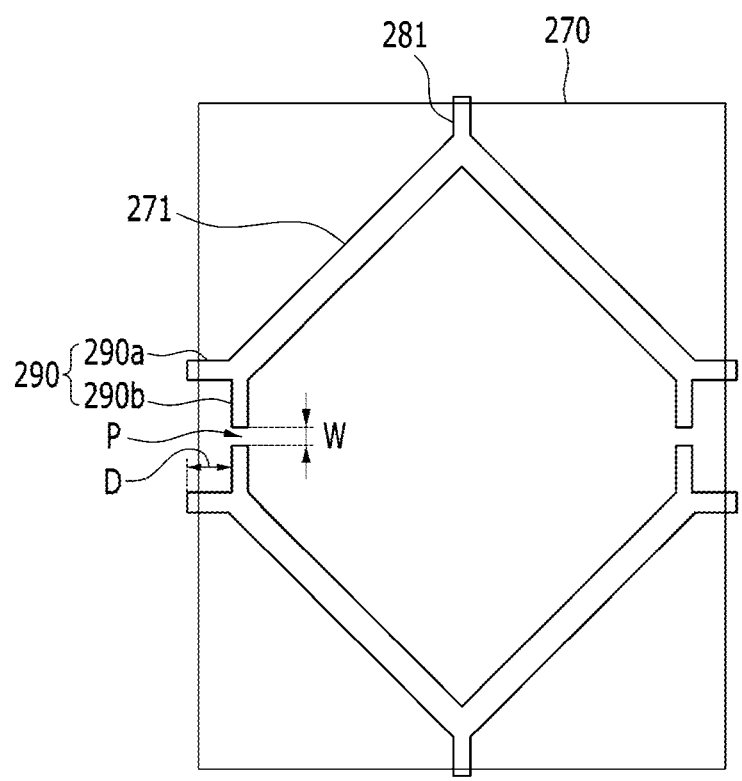
FIG. 2 is a top plan view of an upper electrode of a liquid crystal display according to an exemplary embodiment of the present system and method.
Figure 3:
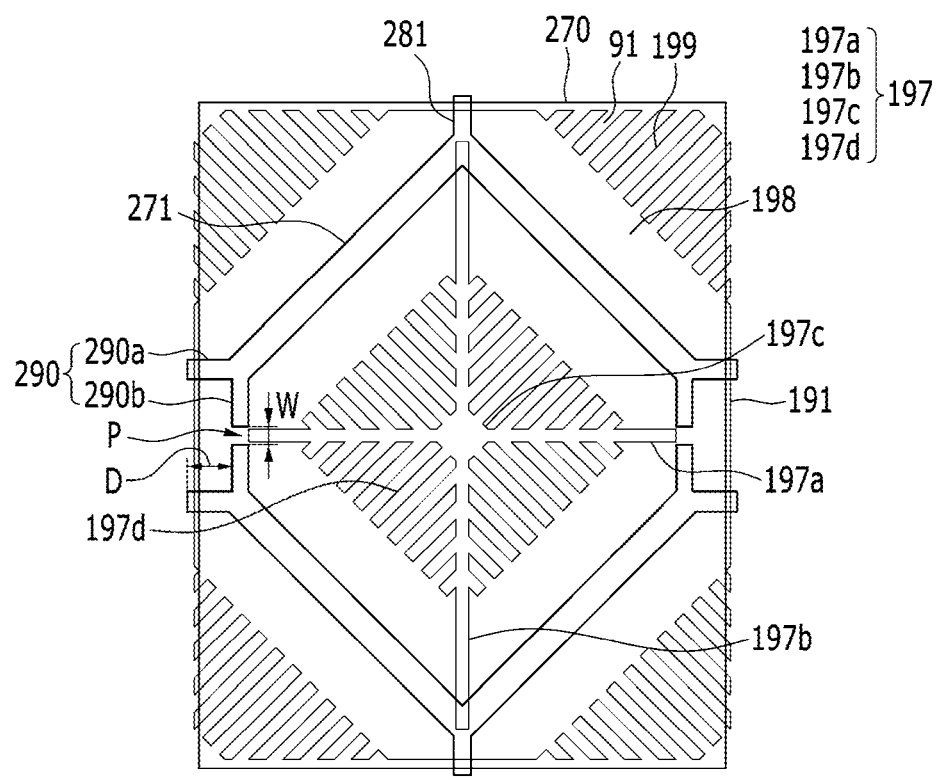
FIG. 3 is a top plan view illustrating the lower electrode of FIG. 1 and the upper electrode of FIG. 2 together.
Figure 4:
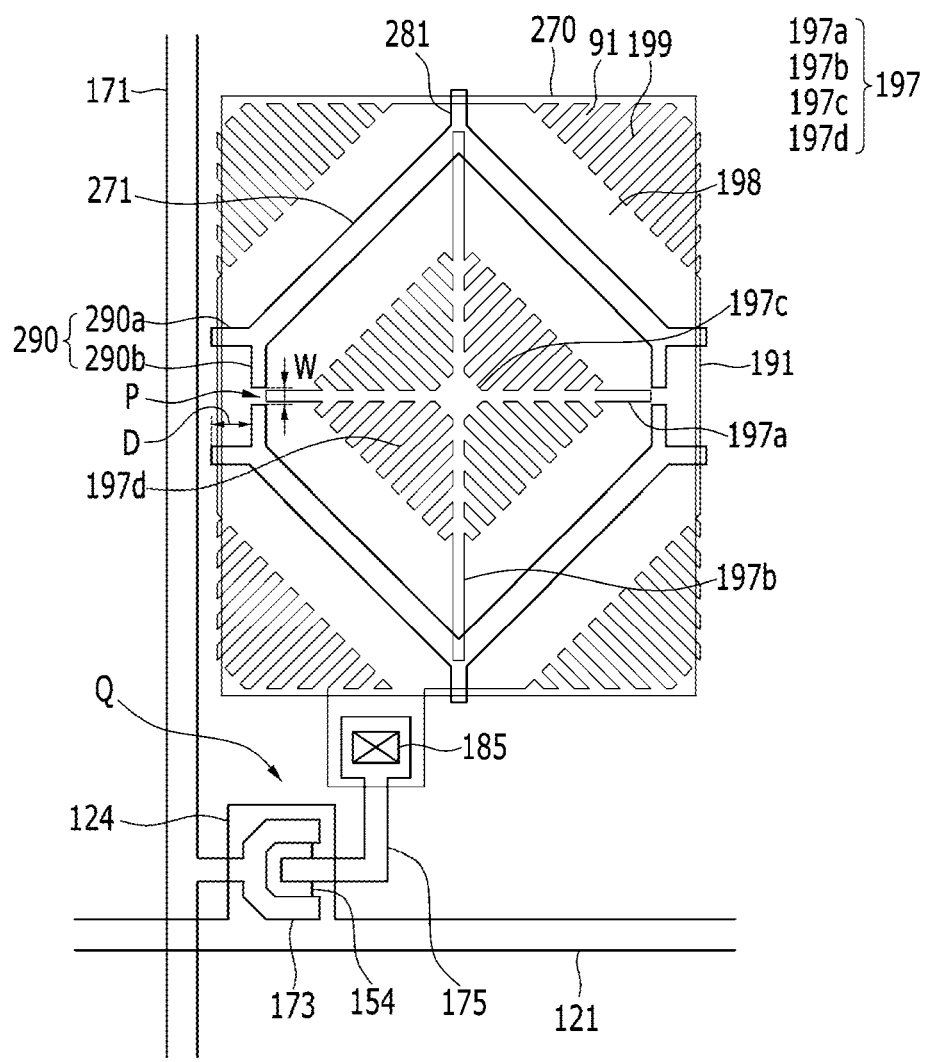
FIG. 4 is a layout view illustrating one pixel of a liquid crystal display according to an exemplary embodiment of the present system and method.
Figure 5:
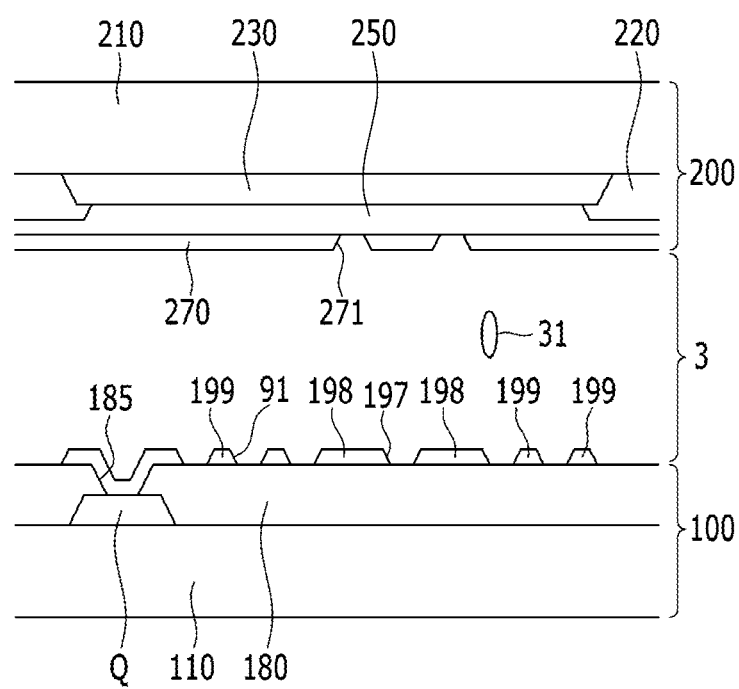
FIG. 5 is a cross-sectional view of the liquid crystal display of FIG. 4.

First, a liquid crystal display according to an exemplary embodiment of the present system and method is described with reference to FIG. 1 to FIG. 5. FIG. 1 is a top plan view of a lower electrode of a liquid crystal display according to an exemplary embodiment of the present system and method. FIG. 2 is a top plan view of an upper electrode of a liquid crystal display according to an exemplary embodiment of the present system and method. FIG. 3 is a top plan view illustrating the lower electrode of FIG. 1 and the upper electrode of FIG. 2 together. FIG. 4 is a layout view illustrating one pixel of a liquid crystal display according to an exemplary embodiment of the present system and method. FIG. 5 is a cross-sectional view of the liquid crystal display of FIG. 4.

Referring to FIG. 4 and FIG. 5, the liquid crystal display includes a lower panel 100 and an upper panel 200 facing each other, and a liquid crystal layer 3 interposed between the two display panels 100 and 200. A gate line 121 including a gate electrode 124 is formed on an insulation substrate 110 of the lower panel 100. The gate line 121 transmits a gate signal and extends in the horizontal direction shown in FIG. 4.

A gate insulating layer (not shown) is formed on the gate line 121. A semiconductor 154, which may be made of hydrogenated amorphous silicon, polysilicon, or an oxide semiconductor, is positioned on the gate insulating layer.

A data line 171 and a drain electrode 175 are formed on the semiconductor 154 and the gate insulating layer. The data line 171 transmits data voltages and extends in the longitudinal direction shown in FIG. 4 intersecting the gate line 121. The data line 171 includes a source electrode 173 extending toward the gate electrode 124. The drain electrode 175 is separated from the data line 171 and includes a portion facing the source electrode 173.

The gate electrode 124, the source electrode 173, the drain electrode 175, and the semiconductor 154 together form a thin film transistor (TFT) Q. A passivation layer 180 is positioned on the thin film transistor Q. The passivation layer 180 has a contact hole 185 exposing the drain electrode 175.

A lower electrode 191 is formed on the passivation layer 180. The lower electrode 191 may be made of a transparent conductive material such as indium tin oxide (ITO) or indium zinc oxide (IZO), or a reflective metal such as aluminum, silver, chromium, or an alloy thereof. The lower electrode 191 may receive the data voltage through the thin film transistor Q controlled by the gate signal.

Referring to FIG. 1, the overall shape of the lower electrode 191 positioned at one pixel PX is quadrangular. The lower electrode 191 includes a center electrode 198 disposed at the center thereof. A first cutout 197 is disposed at the center of the center electrode 198. The lower electrode 191 also includes a plurality of minute branches 199 that extend outward from an edge of the center electrode 198.

The first cutout 197 includes cross-shaped cutouts 197a and 197b, a central cutout 197c disposed at the intersection of the cross-shaped cutouts 197a and 197b, and central minute cutouts 197d that extend from the cross-shaped cutouts 197a and 197b and the central cutout 197c.

The cross-shaped cutouts 197a and 197b include a horizontal cutout 197a that extends substantially in parallel with the gate line 121, and a vertical cutout 197b that extends substantially in parallel with the data line 171.

In the case shown in FIG. 1, the lower electrode 191 of one pixel PX is divided into four sub-regions by the cross-shaped cutouts 197a and 197b, and a third cutout 281, which is described later.

The central cutout 197c may be formed at a region where the horizontal cutout 197a and the vertical cutout 197b cross each other and to have a polygonal shape (e.g., a rhombic shape) including four linear sides positioned at the four sub-regions. A vertex of the central cutout 197c may be connected to the horizontal cutout 197a and the vertical cutout 197b.

The central minute cutouts 197d extending from the cross-shaped cutouts 197a and 197b and the central cutout 197c may be formed to have an overall rhombic shape. In other words, the central minute cutouts 197d in different sub-regions are disposed to extend in different directions. Specifically, as FIG. 1 shows, the central minute cutouts 197d of the upper left sub-region (among the four sub-regions) of the lower electrode 191 obliquely extend from the cross-shaped cutouts 197a and 197b and the central cutout 197c in the upper left direction. The central minute cutouts 197d of the upper right sub-region obliquely extend from the cross-shaped cutouts 197a and 197b and the central cutout 197c in the upper right direction. The central minute cutouts 197d of the lower left sub-region obliquely extend from the cross-shaped cutouts 197a and 197b and the central cutout 197c in the lower left direction. The central minute cutouts 197d of the lower right sub-region obliquely extend from the cross-shaped cutouts 197a and 197b and the central cutout 197c in the lower right direction.

The minute branches 199 extend from a side edge of the center electrode 198 to a corner of the lower electrode 191. A minute slit 91 where a portion of the lower electrode 191 is removed is disposed between adjacent minute branches 199.

In other words, the minute branches 199 are disposed at the corners of the four sub-regions that are divided by the cross-shaped cutouts 197a and 197b, and the minute branches 199 disposed at each of the sub-regions extend in different directions.

Specifically, as FIG. 1 shows, the minute branches 199 of the upper left sub-region (among the four sub-regions) obliquely extend from the center electrode 198 of the lower electrode 191 in the upper left direction. The minute branches 199 of the upper right sub-region obliquely extend from the center electrode 198 of the lower electrode 191 in the upper right direction. The minute branches 199 of the lower left sub-region obliquely extend from the center electrode 198 of the lower electrode 191 in the lower left direction. The minute branches 199 of the lower right sub-region obliquely extend from the center electrode 198 of the lower electrode 191 in the lower right direction.

End portions of at least some of the minute branches 199 are connected to each other through linear connections (not shown). For example, at least one of the end portions of the minute branches 199 disposed at an upper end, a lower end, a left end, and a right end of the lower electrode 191 may be connected to each other to form an external frame of the lower electrode 191.

Referring to FIG. 5, a color filter 230 and a light blocking member 220 may be disposed on an insulation substrate 210 of the upper panel 200. The light blocking member 220, which is also referred to as a black matrix, prevents light leakage between the upper panel 200 and the lower electrode 191. The color filter 230 may display one of several primary colors, such as the three primary colors of red, green, and blue. In another embodiment different from that illustrated in FIG. 5, the light blocking member 220 and/or the color filter 230 may be disposed on the lower panel 100.

An overcoat 250 is positioned on the color filter 230 and the light blocking member 220, and an upper electrode 270 is positioned on the overcoat 250. The upper electrode 270 may be made of a transparent conductor or a metal such as ITO and IZO. The upper electrode 270 may receive a common voltage Vcom.

Referring to FIG. 2, the upper electrode 270 of one pixel PX is shown and includes a second cutout 271 having a substantially rhombic shape, the third cutout 281 connected to upper and lower vertices of the second cutout 271 to form a boundary between the sub-regions together with the first cutout 197, and a fourth cutout 290 connected to left and right vertices of the second cutout 271.

The second cutout 271 has a rhombic shape including four linear cutouts that are respectively disposed at the four sub-regions. Specifically, as FIG. 2 shows, a first linear cutout of the sub-region disposed at the upper left side meets a second linear cutout of the sub-region disposed at the upper right side to form an upper vertex. A third linear cutout of the sub-region disposed at the lower left side meets a fourth linear cutout of the sub-region disposed at the lower right side to form a lower vertex. The third cutout 281 is connected to the upper and lower vertices of the four linear cutouts and extends outwardly away from the vertices. That is, the third cutout 281 extends in the same direction as that of the vertical cutout 197b.

The fourth cutout 290 includes a first branch cutout 290a and a second branch cutout 290b. The first branch cutout is formed in the horizontal direction (with respect to FIG. 2) and connected to the left and right vertices of the second cutout 271. The second branch cutout 290b is formed to be perpendicular to the first branch cutout 290a and connected to the second cutout 271. Moreover, the first branch cutout 290a may be formed to be perpendicular to the adjacent data line 171 and connected to the left and right vertices of the second cutout 271. The second branch cutout 290b may be formed separately from the left and right ends of the upper electrode 270 at a predetermined distance D and connected to the left and right vertices of the second cutout 271. Also, the second branch cutout 290b has a gap P that is disconnectedly formed at the center.

Referring to FIG. 1 to FIG. 4, the second cutout 271 of the upper electrode 270 is disposed between the minute branches 199 of the lower electrode 191 and the first cutout 197 of the lower electrode 191, and overlaps with the center electrode 198 of the lower electrode 191. In other words, the second cutout 271 is formed to have a rhombic shape that is larger than that of the central cutout 197c of the lower electrode 191 and surrounds the first cutout 197 of the lower electrode 191.

The vertical cutout 197b of the lower electrode 191 and the second cutout 271 of the upper electrode 270 are formed to partially overlap each other. Specifically, an end portion of the vertical cutout 197b of the lower electrode 191 is formed to overlap the vertex of the second cutout 271 of the upper electrode 270. Moreover, as FIGS. 3 and 4 show, the vertical cutout 197b of the lower electrode 191 and the third cutout 281 of the upper electrode 270 extend in the same direction.

The unit electrode constituted by the lower electrode 191 and the upper electrode 270 may be divided into a plurality of sub-regions by the cross-shaped cutouts 197a and 197b of the lower electrode 191 and the third cutout 281 of the upper electrode 270.

The first branch cutout 290a of the fourth cutout 290 may extend perpendicular to the adjacent data line 171 and connected to the left and right vertices of the second cutout 271. The second branch cutout 290b of the fourth cutout 290 may extend perpendicular to the first branch cutout 290a and parallel to the data line 171. The second branch cutout 290b may be formed from left and right ends of the upper electrode 270 to have a distance D that is equal to or greater than 8 μm. In other words, the first branch cutout 290a may be formed from the left and right ends of the upper electrode 270 so as to have a length that is equal to or greater than 8 μm.

Further, the second branch cutout 290b has the gap P that is disconnected in the direction in which the horizontal cutout 197a is extended. In the case shown in FIGS. 3 and 4, the horizontal cutout 197a does not extend through the gap P. That is, the horizontal cutout 197a extends toward but ends before reaching the gap P. The gap P may be formed to have a width that is equal to or smaller than 4.5 μm.

As such, according to an exemplary embodiment of the present system and method, as the second branch cutout 290b is formed from the left and right ends of the upper electrode 270 to have the distance D that is equal to or greater than 8 μm and the gap P is formed to have the width that is equal to or smaller than 4.5 μm, transmittance deterioration due to the lower electrode 191 and the upper electrode 270 being misaligned from each other may be ameliorated. This is further described later.

Referring to FIG. 5, the liquid crystal layer 3 disposed between the display panels 100 and 200 includes liquid crystal molecules 31 having negative dielectric anisotropy. That is, the liquid crystal molecules 31 are arranged such that their longitudinal axis are perpendicular to the planar surfaces of the two display panels 100 and 200 in the absence of an electric field.

The alignment of the liquid crystal molecules 31 of one pixel PX may differ based on the sub-region to which the liquid crystal molecules belong, and may not be pre-tilted in the length direction of the minute branch 199 with respect to the surface of the display panels 100 and 200. That is, it is not necessary for the liquid crystal layer 3 or the alignment layers 11 and 21 to include a hardened alignment aid to pre-tilt the liquid crystal molecules 31, unlike in a conventional art.

As such, the liquid crystal display according to an exemplary embodiment of the present system and method does not require an additional process such as a hardening process to harden an alignment aid for pre-tilting the liquid crystal molecules. Accordingly, it is possible to reduce the manufacturing cost of the liquid crystal display and simplify the manufacturing process.

A polarizer (not shown) is disposed on an external surface of at least one of the two display panels 100 and 200. The polarization axes of two polarizers may be perpendicular to each other, and one of the polarization axes may be substantially parallel with the gate line 121.

Figure 6A:
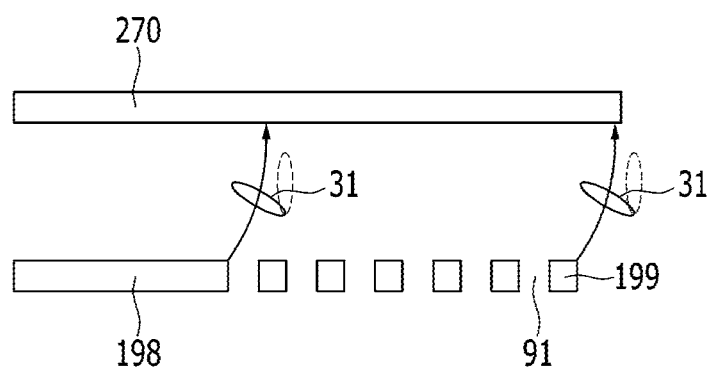
FIG. 6A and FIG. 6B illustrate fringe fields generated by a lower electrode and an upper electrode of a liquid crystal display according to an exemplary embodiment of the present system and method.
Figure 6B:
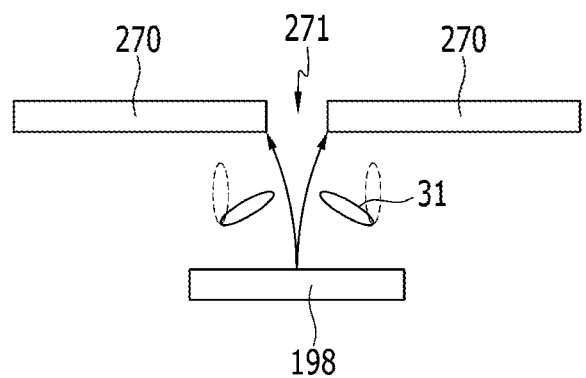

Next, a driving method of the liquid crystal display according to an exemplary embodiment of the present system and method is described with reference to FIG. 6A and FIG. 6B as well as FIG. 1 to FIG. 5. FIG. 6A and FIG. 6B illustrate fringe fields generated by a lower electrode and an upper electrode of a liquid crystal display according to an exemplary embodiment of the present system and method.

When a gate-on voltage Von is applied to a gate electrode 124 of the thin film transistor Q to turn on the thin film transistor Q, the data voltage is applied to the lower electrode 191. The lower electrode 191 applied with the data voltage and the upper electrode 270 applied with the common voltage Vcom together generate the electric field in the liquid crystal layer 3.

The electric field includes a vertical component that is perpendicular to the planar surfaces of the display panels 100 and 200. In response to the vertical component of the electric field, the liquid crystal molecules 31 tend to incline in a direction parallel to the surfaces of the display panels 100 and 200.

Referring to FIG. 6A and FIG. 6B, the edge of the minute branch 199 of the lower electrode 191, the center electrode 198 of the lower electrode 191, and the second cutout 271 of the upper electrode 270 generate the fringe field. Specifically, referring to FIG. 6A, the fringe field causes the liquid crystal molecules 31 positioned near the edge of the minute branches 199 and the edge of the center electrode 198 to incline toward the inside of the center electrode 198 and the minute branches 199 of the lower electrode 191. Referring to FIG. 6B, fringe field causes the liquid crystal molecules 31 positioned near the edge of the second cutout 271 of the upper electrode 270 incline toward the inside of the second cutout 271.

As a result, the liquid crystal molecules 31 are mostly inclined toward the center portion of the second cutout 271 in a direction parallel to the minute branches 199. Accordingly, the inclination directions (referred to as an arrangement direction) of the liquid crystal molecules 31 are different with respect to the second cutout 271 of the upper electrode 270.

Hereinafter, a liquid crystal display according to an exemplary embodiment of the present system, which ameliorates transmittance deterioration even when a lower electrode and an upper electrode are misaligned from each other, is described with reference to FIG. 7 to FIG. 10 as well as FIG. 1 to FIG. 5.

Figure 7A:
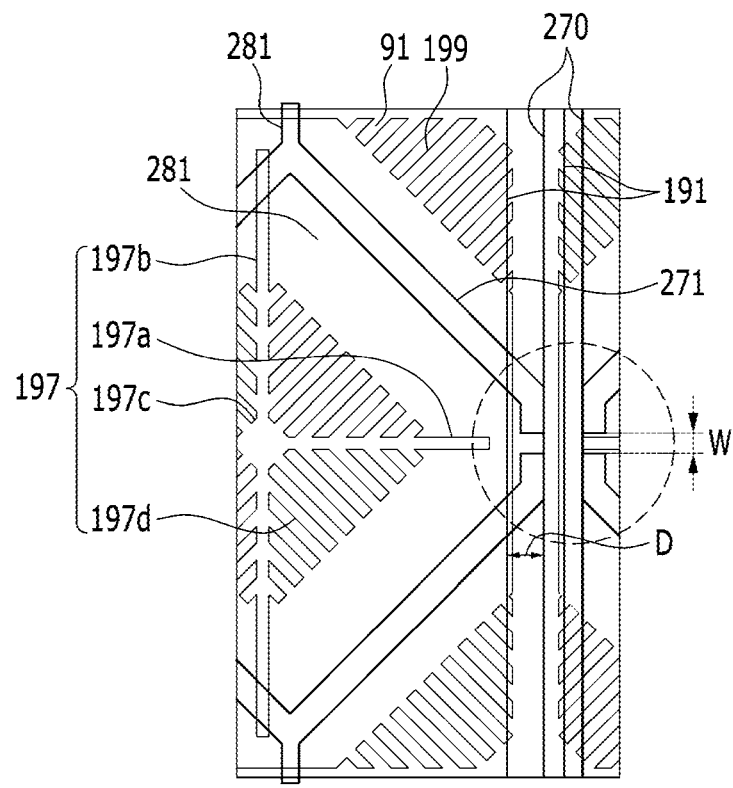
FIG. 7A and FIG. 7B are views for explaining misalignment of a lower electrode and an upper electrode.
Figure 7B:
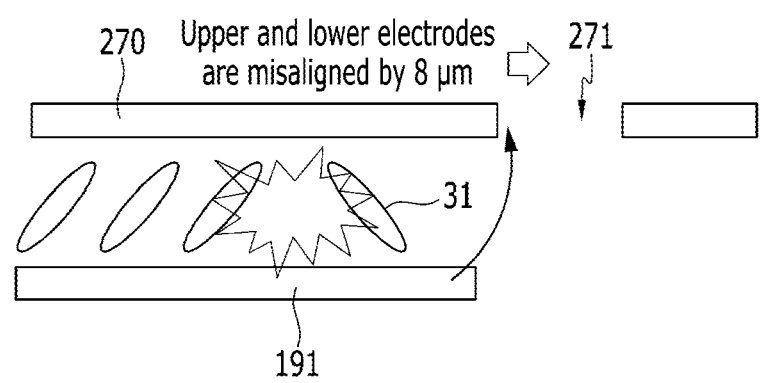
Figure 8A:
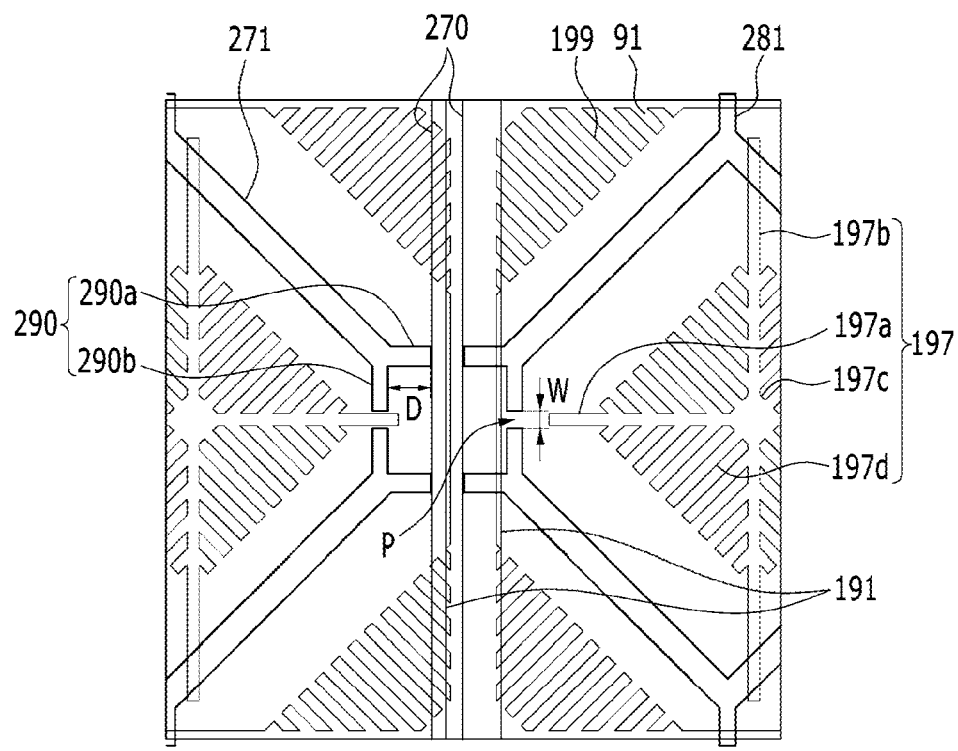
FIG. 8A and FIG. 8B illustrate a liquid crystal display according to an exemplary embodiment of the present system and method.
Figure 8B:
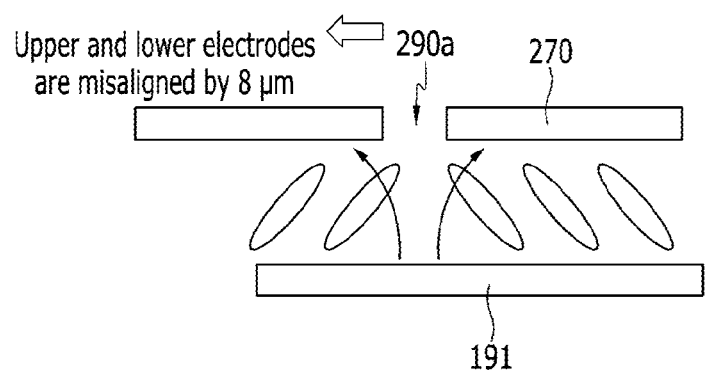

FIG. 7A and FIG. 7B are views for explaining misalignment of a lower electrode and an upper electrode. FIG. 7A is a top plan view of a liquid crystal display without the fourth cutout 290 in the lower electrode 191. FIG. 7B is a cross-sectional view of the liquid crystal display without the fourth cutout 290 in the lower electrode 191. FIG. 8A and FIG. 8B illustrate a liquid crystal display according to an exemplary embodiment of the present system and method. FIG. 8A is a top plan view of a liquid crystal display with the fourth cutout 290 in the lower electrode 191. FIG. 8B is a cross-sectional view of the liquid crystal display with the fourth cutout 290 in the lower electrode 191.

Figure 9A:
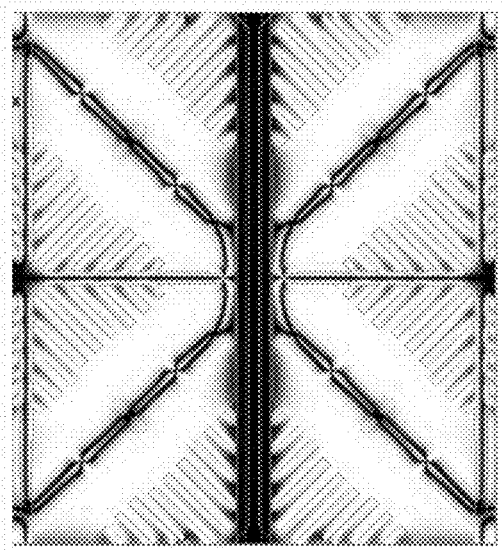
FIG. 9A and FIG. 9B are views of simulations for a liquid crystal display in which a fourth cutout 290 is not included in a lower electrode 191.
Figure 9B:
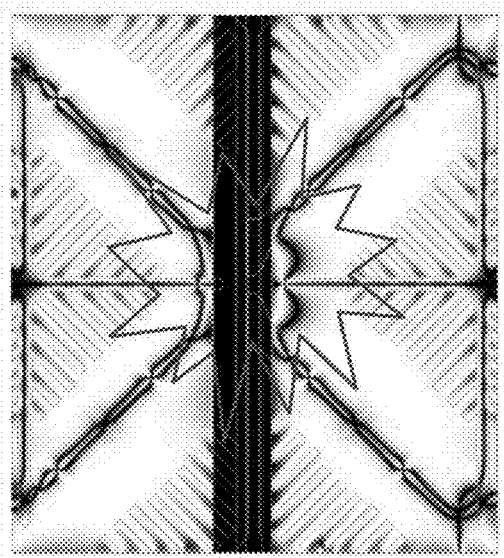
Figure 10A:
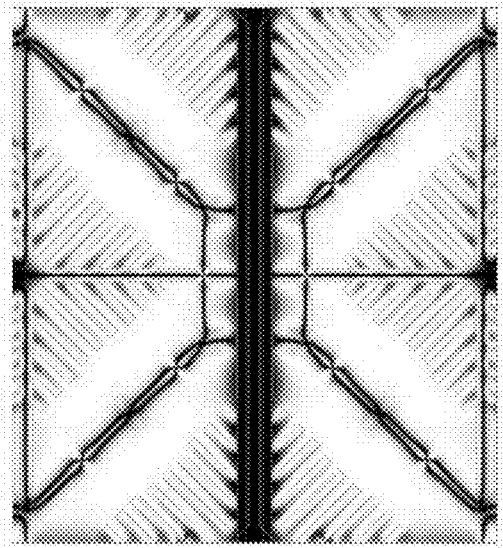
FIG. 10A and FIG. 10B are views of simulations for a liquid crystal display in which a fourth cutout 290 is included in a lower electrode 191.
Figure 10B:
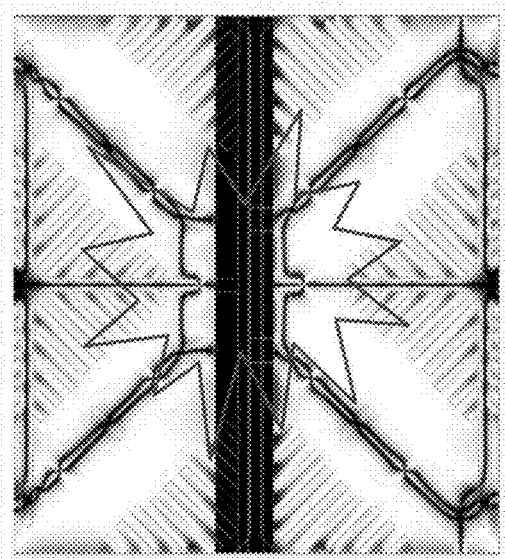

FIG. 9A and FIG. 9B are views of simulations for a liquid crystal display without the fourth cutout 290 in the lower electrode 191. FIG. 9A is a simulation image in which the lower electrode 191 and the upper substrate 20 are aligned with each other. FIG. 9B is a simulation image in which the lower electrode 191 and the upper substrate 20 are misaligned from each other. FIG. 10A and FIG. 10B are views of simulations for a liquid crystal display with a fourth cutout 290 in the lower electrode 191. FIG. 10A is a simulation image in which the lower electrode 191 and the upper substrate 20 are aligned with each other. FIG. 10B is a simulation image in which the lower electrode 191 and the upper substrate 20 are misaligned from each other. FIG. 11 is a table illustrating how transmittance deterioration of a liquid crystal display according to an exemplary embodiment of the present system and method is ameliorated.

First, referring to FIG. 7A and FIG. 7B, when the upper electrode 270 and the lower electrode 191 are misaligned and separated from each other by predetermined distance (8 μm), the second cutout 271 of the upper electrode 270 cannot adjust the direction in which the liquid crystal molecules 31 are tilted, thereby generating collisions of the liquid crystal molecules 31. As a result, the transmittance is deteriorated.

As shown in FIG. 9A and FIG. 9B, when the upper electrode 270 and the lower electrode 191 are misaligned and separated from each other by 8 μm, texture is generated. As a result, the transmittance is deteriorated as compared with the case in which the upper electrode 270 and the lower electrode 191 are aligned with each other.

Next, referring to FIG. 8A and FIG. 8B, which show an exemplary embodiment of the present system and method, no texture is generated even when the upper electrode 270 and the lower electrode 191 are misaligned and separated from each other by 8 μm because the direction in which the liquid crystal molecules 31 are inclined is adjusted by the first branch cutout 290a of the fourth cutout 290. As a result, the liquid crystal molecules 31 are prevented from colliding, and the deterioration of the transmittance is ameliorated.

Further, the gap P may be formed to have a width that is equal to or smaller than 4.5 μm. If the width of the gap P is greater than 4.5 μm, the transmittance deterioration may not be ameliorated.

FIG. 10A and FIG. 10B show that texture generation is reduced even when the upper electrode 270 and the lower electrode 191 are misaligned and separated from each other by 8 μm as compared with the case in which the upper electrode 270 and the lower electrode 191 are aligned with each other. Specifically, FIG. 11 shows when the upper electrode 270 and the lower electrode 191 are misaligned and separated from each other by 8 μm, the transmittance of the liquid crystal display including fourth cutout 290 according to an exemplary embodiment of the present system and method is increased by 0.92% as compared with the case in which no fourth cutout 290 is included.

As such, the liquid crystal display according to an exemplary embodiment of the present and system ameliorates transmittance deterioration due to the upper electrode 270 and the lower electrode 191 being misaligned from each other by including the fourth cutout 290 in the upper electrode 270.

Next, a liquid crystal display according to an exemplary embodiment of the present system that ameliorates transmittance deterioration due to a lower electrode and an upper electrode being misaligned from each other is described with reference to FIG. 12 and FIG. 13. The same constituent elements as in the above-described exemplary embodiments are designated by the same reference numerals, and the duplicate description is omitted.

Figure 12:
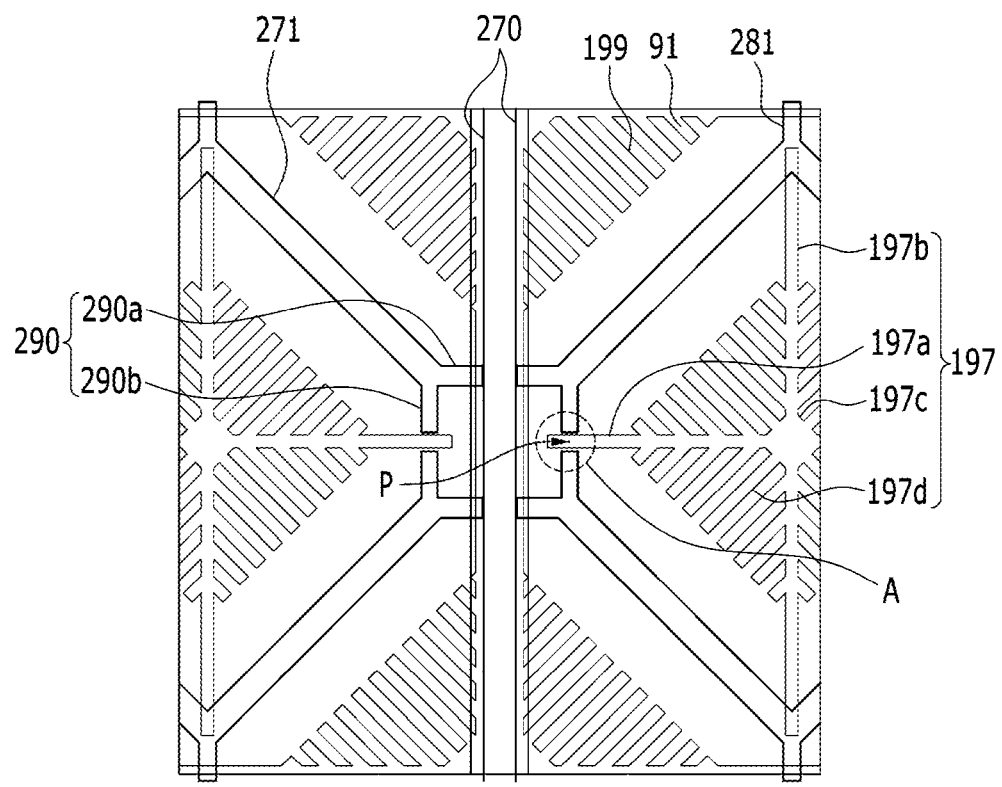
FIG. 12 is a top plan view illustrating a unit electrode of a liquid crystal display according to an exemplary embodiment of the present system and method.
Figure 13:
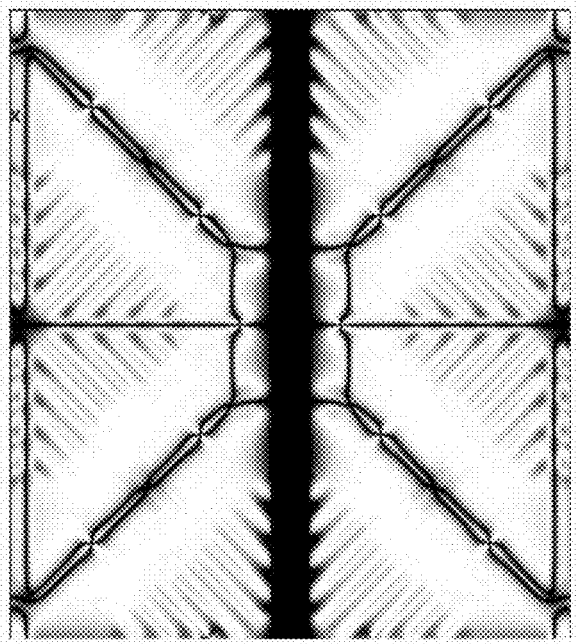
FIG. 13 is a simulation result image illustrating how transmittance deterioration of a liquid crystal display according to an exemplary embodiment of the present system and method is ameliorated.

FIG. 12 is a top plan view illustrating a unit electrode of a liquid crystal display according to an exemplary embodiment of the present system and method. FIG. 13 is a simulation result image illustrating how transmittance deterioration of a liquid crystal display according to an exemplary embodiment of the present system and method is ameliorated.

Referring to FIG. 12, the upper electrode 270 is the same as that of the aforementioned exemplary embodiment except that the horizontal cutout 197a extends through the gap P of the second branch cutout 290b. Referring to FIG. 13, even when the upper electrode 270 is formed with the horizontal cutout 197a of the second branch cutout 290b extending through the gap P, no texture is generated when the upper electrode 270 and the lower electrode 191 are misaligned from each other. That is, transmittance deterioration due to the misalignment is ameliorated.

Figure 14:
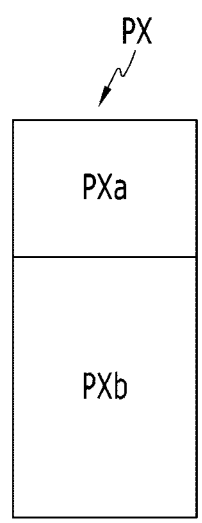
FIG. 14 illustrates two subpixels included in one pixel of a liquid crystal display according to an exemplary embodiment of the present system and method.

FIG. 14 illustrates two subpixels included in one pixel of a liquid crystal display according to an exemplary embodiment of the present system and method. Referring to FIG. 14, one pixel PX of a liquid crystal display may include a first sub-pixel PXa and a second sub-pixel PXb. The first sub-pixel PXa and the second sub-pixel PXb may display images according to the same or different gamma curves for one input image signal. That is, the first sub-pixel PXa and the second sub-pixel PXb of one pixel PX may display images having different luminance levels to improve side visibility for the one input image signal. The first sub-pixel PXa and the second sub-pixel PXb may have the same or different areas.

Figure 15:
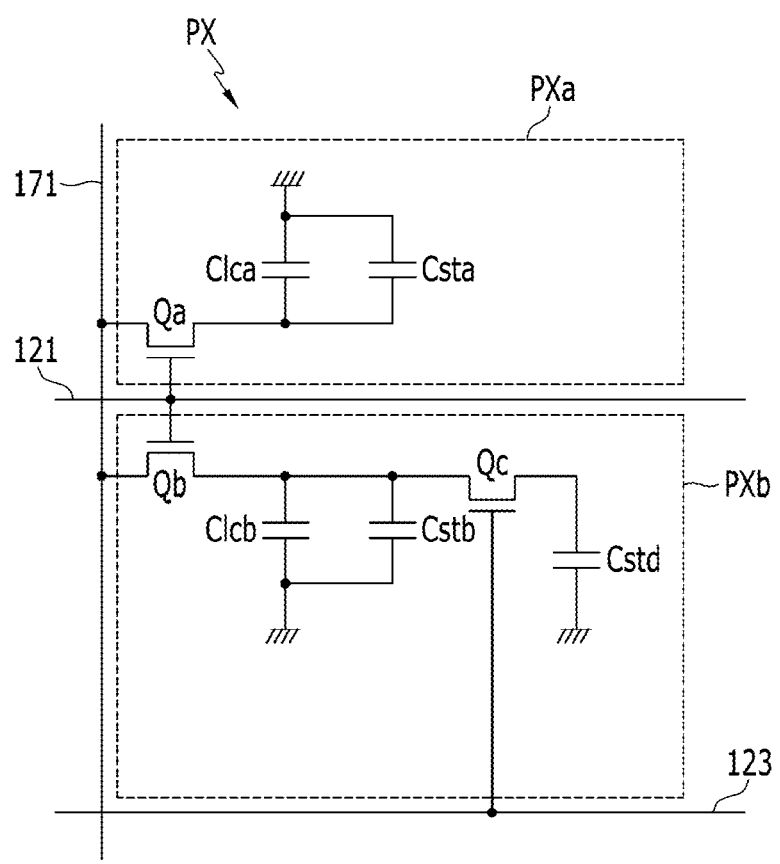
FIG. 15 is an equivalent circuit diagram of one pixel of a liquid crystal display according to an exemplary embodiment of the present system and method.

The pixel PX including the first sub-pixel PXa and the second sub-pixel PXb may have various circuit structures and dispositions to display the images having different luminance levels. FIG. 15 is a circuit diagram of one pixel of a liquid crystal display according to an exemplary embodiment of the present method and system. Referring to FIG. 15, the liquid crystal display includes signal lines including a gate line 121, a step-down gate line 123, and a data line 171, and a pixel PX connected to the signal lines.

Each pixel includes first and second subpixels PXa and PXb. The first subpixel PXa includes a first switching element Qa, a first liquid crystal capacitor Clca, and a first storage capacitor Csta. The second subpixel PXb includes second and third switching elements Qb and Qc, a second liquid crystal capacitor Clcb, a second storage capacitor Cstb, and a step-down capacitor Cstd.

The first and second switching elements Qa and Qb are respectively connected to the gate line 121 and the data line 171. The third switching element Qc is connected to the step-down gate line 123.

The switching elements Qa and Qb are three-terminal elements such as thin film transistors and each include a control terminal, an input terminal, and an output terminal. The control terminals are connected to the gate line 121. The input terminals are connected to the data line 171. The output terminals of switching elements Qa and Qb are respectively connected to the first and second liquid crystal capacitors Clca and Clcb, and respectively to the first and second storage capacitors Csta and Cstb.

The third switching element Qc is also a three-terminal element (e.g., a thin film transistor) having a control terminal, an input terminal, and an output terminal. The control terminal is connected to the step-down gate line 123. The input terminal is connected to the second liquid crystal capacitor Clcb. The output terminal is connected to the step-down capacitor Cstd. The step-down capacitor Cstd is connected to the output terminal of the third switching element Qc and a common voltage.

An operation of the pixel PX is now described. First, a gate-on voltage Von is applied to the gate line 121, thereby turning on the first and second switching elements Qa and Qb connected thereto. The data voltage of the data line 171 is applied to the first and second liquid crystal capacitors Clca and Clcb through the turned-on first and second switching elements Qa and Qb. As a result, the first and second liquid crystal capacitors Clca and Clcb are charged by the voltage difference between the data voltage Vd and the common voltage Vcom. The step-down gate line 123 is applied with a gate-off voltage Voff.

Next, when the gate off voltage Voff is applied to the gate line 121 and the gate-on voltage Von is applied to the step-down gate line 123, the first and second switching elements Qa and Qb are turned off, and the third switching element Qc is turned on. As a result, a charging voltage of the second liquid crystal capacitor Clcb connected with the output terminal of the second thin film transistor Qb is reduced. Accordingly, when the liquid crystal display is driven by frame inversion, the charging voltage of the second liquid crystal capacitor Clcb is lower than a charging voltage of the first liquid crystal capacitor Clca. By differentiating the charge voltages of the first and second liquid crystal capacitors Clca and Clcb, it is possible to improve the visibility of the liquid crystal display.

Figure 16:
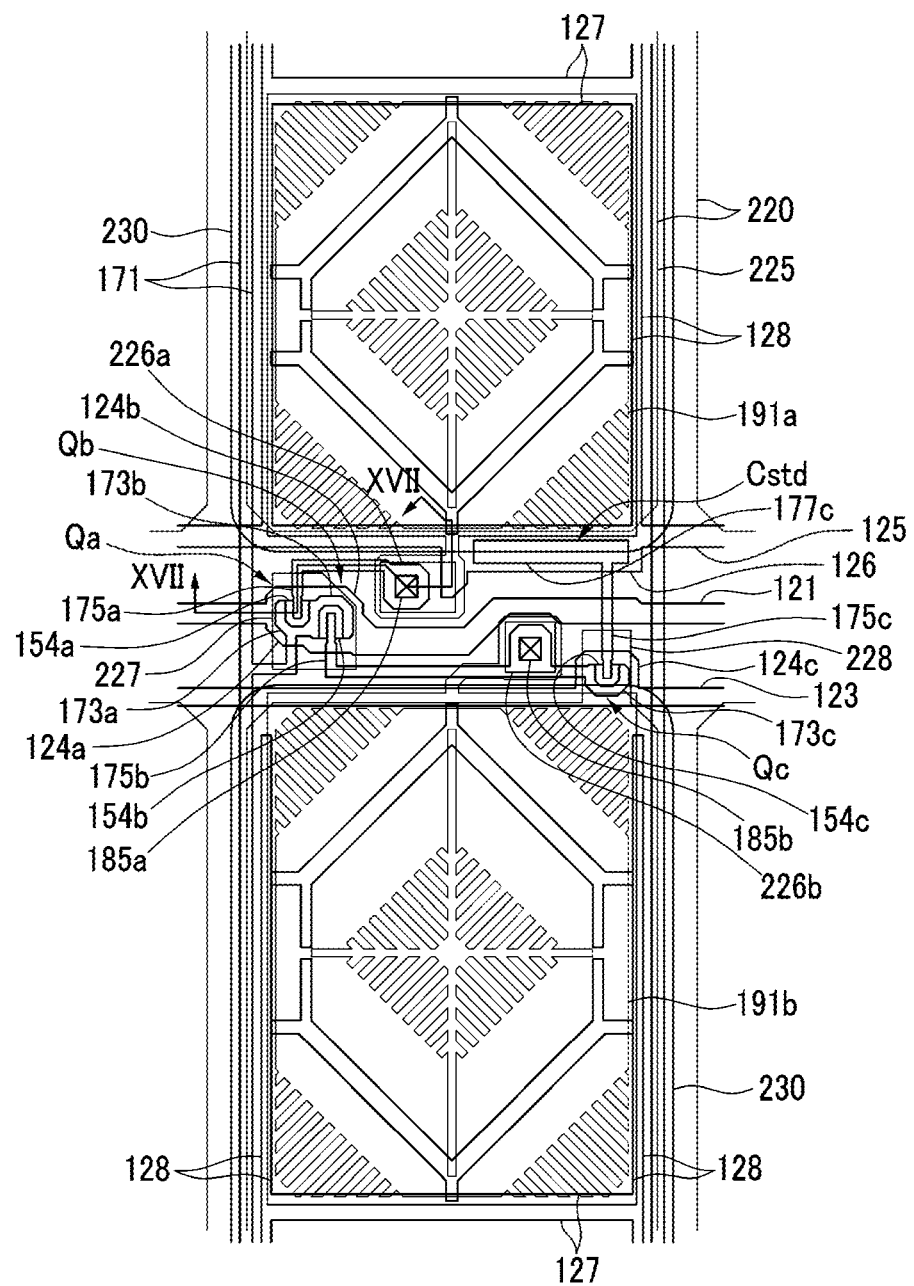
FIG. 16 is a top plan view of one pixel of a liquid crystal display according to an exemplary embodiment of the present system and method.
Figure 17:
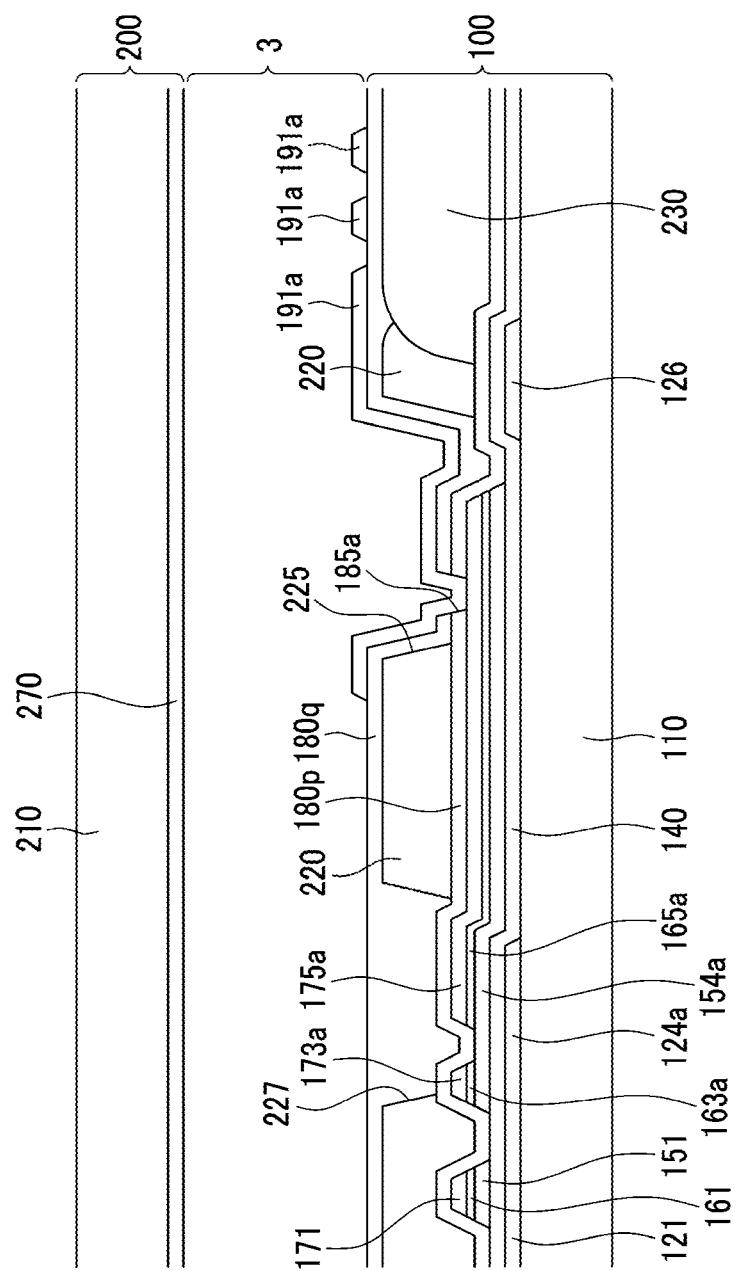
FIG. 17 is a cross-sectional view of liquid crystal display of FIG. 16 taken along the line XVII-XVII.

Now, referring to FIG. 16 to FIG. 17, a liquid crystal display having the circuit structure illustrated in FIG. 15 according to an exemplary embodiment of the present system and method is described. The same constituent elements as in the above-described exemplary embodiments are designated by the same reference numerals, and duplicate description is not provided.

FIG. 16 is a top plan view of one pixel of a liquid crystal display according to an exemplary embodiment of the present system and method. FIG. 17 is a cross-sectional view of liquid crystal display of FIG. 16 taken along the line XVII-XVII.

Referring to FIG. 16 and FIG. 17, the liquid crystal display includes lower and upper display panels 100 and 200 facing each other, and a liquid crystal layer 3 interposed between the two display panels 100 and 200.

Since the liquid crystal layer 3 is the same as that of the exemplary embodiment described above with reference to FIG. 1 to FIG. 5, a detailed description thereof is omitted.

First, the lower display panel 100 is described. A plurality of gate conductors including the gate line 121, the step-down gate line 123, and a storage electrode line 125 are formed on an insulation substrate 110. The gate line 121 and the step-down gate line 123 extend lengthwise in the horizontal direction shown in FIG. 16 and transmit a gate signal. The gate line 121 may include a first gate electrode 124a and a second gate electrode 124b. The step-down gate line 123 may include a third gate electrode 124c. The first and second gate electrodes 124a and 124b are connected with each other. The storage electrode line 125 also extends in the horizontal direction of FIG. 16 and transmits a predetermined voltage such as the common voltage Vcom. The storage electrode line 125 may include a storage extension portion 126, a pair of vertical portions 128 that extends upwards to be perpendicular to the gate line 121, and a horizontal portion 127 connecting the pair of vertical portions 128. The structure of the storage electrode line 125, however, is not limited thereto.

A gate insulating layer 140 is positioned on the gate conductor, and a linear semiconductor 151 is positioned on the gate insulating layer 140. The linear semiconductor 151 may mainly extend in a vertical direction, and include first, second, and third semiconductors 154a, 154b, and 154c. The first and second semiconductors 154a and 154b extend toward the first and second gate electrodes 124a and 124b and are connected with each other. The third semiconductor 154c is connected with the second semiconductor 154b.

An ohmic contact 161 is formed on the linear semiconductor 151. Ohmic contacts 163a and 165a are formed on the first semiconductor 154a. Ohmic contacts are also formed on the second semiconductor 154b and the third semiconductor 154c. The ohmic contacts 161 and 165a may be omitted in some embodiments.

A data conductor including the data line 171, a first drain electrode 175a, a second drain electrode 175b, and a third drain electrode 175c is formed on the ohmic contacts 161 and 165a. The data line 171 may include a first source electrode 173a and a second source electrode 173b that extends toward the first gate electrode 124a and the second gate electrode 124b Rod-shaped end portions of the first drain electrode 175a and the second drain electrode 175b are partially surrounded by the first source electrode 173a and the second source electrode 173b. One wide end of the second drain electrode 175b is extended again to form a third source electrode 173c bent in a U-shape. A wide end portion 177c of the third drain electrode 175c overlaps the storage extension portion 126 to form the step-down capacitor Cstd. A rod-shaped end portion of the third drain electrode 175c is partially surrounded by the third source electrode 173c.

The first, second, and third gate electrodes 124a, 124b, and 124c, the first, second, and third source electrodes 173a, 173b, and 173c, and the first, second, and third drain electrodes 175a, 175b, and 175c form the first, second, and third switching elements Qa, Qb, and Qc together with the first, second, and third semiconductors 154a, 154b, and 154c.

A lower passivation layer 180p may be disposed on the data conductors 171, 175a, 175b, and 175c and exposed portions of the semiconductors 154a, 154b, and 154c. A color filter 230 and a light blocking member 220 may be disposed on the lower passivation layer 180p. The light blocking member 220 may include an opening 227 disposed on the first and second switching elements Qa and Qb, an opening 226a disposed on the wide end portion of the first drain electrode 175a, an opening 226b positioned on the wide end portion of the second drain electrode 175b, and an opening 228 disposed on the third switching element Qc. In other embodiments, the color filter 230 and/or the light blocking member 220 may be disposed on the upper display panel 200.

An upper passivation layer 180q is disposed on the color filter 230 and the light blocking member 220. A plurality of contact holes 185a and 185b respectively exposing the first and second drain electrodes 175a and 175b are formed in the lower passivation layer 180p and the upper passivation layer 180q.

The lower electrode including a first electrode 191a and a second electrode 191b is positioned on the upper passivation layer 180q. Each of the first electrode 191a and the second electrode 191b may have the same structure as that of the lower electrode 191 shown in FIG. 3 according to the exemplary embodiment described above.

The first subpixel electrode 191a may receive the data voltage from the first drain electrode 175a through the contact hole 185a. The second subpixel electrode 191b may receive the data voltage from the first drain electrode 175a through the contact hole 185b.

Next, referring to the upper display panel 200, an upper electrode 270 is disposed on an insulation substrate 210. The upper electrode 270 disposed on each of the subpixels Pxa and PXb may have the same structure as those described above with respect to the various exemplary embodiments (e.g., the upper electrode 270 shown in FIG. 3 or FIG. 12).

The first electrode 191a and the upper panel electrode 270 form the first liquid crystal capacitor Clca along with the liquid crystal layer 3 interposed in between. The second electrode 191b and the upper panel electrode 270 form the second liquid crystal capacitor Clcb along with the liquid crystal layer 3 interposed in between. As a result, the applied voltage is maintained even after the first and second thin film transistors Qa and Qb are turned off. Moreover, the first and second electrodes 191a and 191b may overlap the storage electrode line 125 to form the first and second storage capacitors Csta and Cstb.

While the present system and method have been described in connection with exemplary embodiments, the present system and method are not limited to the disclosed embodiments. On the contrary, those of ordinary skill in the art would understand that the present system and method encompass various modifications and equivalent arrangements.

DESCRIPTION OF SYMBOLS

3: liquid crystal layer 31: liquid crystal molecules
91: minute slit 100, 200: display panel
121: gate line 124: gate electrode
140: gate insulating layer 171: data line
173: source electrode 175: drain electrode
180, 180p, 180q: passivation layer 191: lower electrode
197: first cutout 197a, 197b: cross-shaped cutout
197a: horizontal cutout 197b: vertical cutout
197c: central cutout 197d: central minute cutout
198: center electrode 199: minute branches
220: light blocking member 230: color filter
250: overcoat 270: upper electrode
271: second cutout 281: third cutout
290: fourth cutout 290a: first branch cutout
290b: second branch cutout P: gap

What is claimed is:

1. A liquid crystal display comprising:
    a lower electrode;
    an upper electrode facing the lower electrode; and
    a liquid crystal layer disposed between the lower electrode and the upper electrode and including a plurality of liquid crystal molecules aligned perpendicular to surfaces of the lower electrode and the upper electrode,
    wherein the lower electrode includes a center electrode disposed at the center thereof, a first cutout disposed at the center of the center electrode, and a plurality of minute branches extending outwardly from a side edge of the center electrode, and
    the upper electrode includes a second cutout disposed between the minute branches and the first cutout, a third cutout connected to upper and lower vertices of the second cutout to form a boundary among a plurality of sub-regions together with the first cutout, and a fourth cutout connected to left and right vertices of the second cutout.

2. The liquid crystal display of claim 1, wherein the fourth cutout includes:
    a first branch cutout that is perpendicular to an adjacent data line and connected to left and right vertices of the second cutout; and
    a second branch cutout that is separated from left and right ends of the upper electrode at a distance and connected to the left and right vertices of the second cutout and a vertex of the first branch cutout.

3. The liquid crystal display of claim 2, wherein the second branch cutout is separated from the left and right ends of the upper electrode by 8 µm or more.

4. The liquid crystal display of claim 2, wherein the first cutout includes a cross-shaped cutout, a central cutout disposed at the center of the cross-shaped cutout, and a central minute cutout that extends from the cross-shaped cutout and the central cutout.

5. The liquid crystal display of claim 4, wherein the cross-shaped cutout includes a horizontal cutout and a vertical cutout that cross each other at the center of the center electrode.

6. The liquid crystal display of claim 5, wherein the second branch cutout includes a gap that is disconnectedly formed in a direction in which the horizontal cutout extends.

7. The liquid crystal display of claim 6, wherein a width of the gap is equal to or smaller than 4.5 µm.

8. The liquid crystal display of claim 6, wherein the horizontal cutout extends towards but ends before reaching the gap.

9. The liquid crystal display of claim 6, wherein the horizontal cutout extends through the gap.

10. The liquid crystal display of claim 4, wherein the central cutout is formed to have a polygonal shape including linear sides that are respectively disposed in the sub-regions and a vertex connected to the cross-shaped cutout.

11. The liquid crystal display of claim 4, wherein the central minute cutout is disposed to extend in different directions in different sub-regions.

12. The liquid crystal display of claim 1, wherein the second cutout is formed to have a polygonal shape including linear cutouts that are respectively disposed in the sub-regions and a vertex connected to the third cutout.

13. The liquid crystal display of claim 12, wherein the second cutout is disposed to surround the first cutout.

14. The liquid crystal display of claim 1, wherein the minute branches disposed in different sub-regions extend in different directions.

* * * * *